United States Patent
Veith et al.

(10) Patent No.: US 11,379,926 B1
(45) Date of Patent: *Jul. 5, 2022

(54) HOME DEVICE SENSING

(71) Applicant: Allstate Insurance Company, Northbrook, IL (US)

(72) Inventors: David G. Veith, Oswego, IL (US); David J. Krug, Arlington Heights, IL (US); Douglas Safford, St. Charles, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,505

(22) Filed: Jan. 28, 2021

Related U.S. Application Data

(63) Continuation of application No. 14/027,539, filed on Sep. 16, 2013, now Pat. No. 10,949,923.

(51) Int. Cl.
*G06Q 40/08* (2012.01)
(52) U.S. Cl.
CPC .................................. *G06Q 40/08* (2013.01)
(58) Field of Classification Search
None
See application file for complete search history.

(56) References Cited

U.S. PATENT DOCUMENTS

| | | |
|---|---|---|
| 5,523,942 A | 6/1996 | Tyler et al. |
| 5,648,724 A | 7/1997 | Yankielun et al. |
| 5,818,340 A | 10/1998 | Yankielun et al. |
| 5,884,274 A | 3/1999 | Walker et al. |
| 5,893,072 A | 4/1999 | Zizzamia |
| 5,970,464 A | 10/1999 | Apte et al. |
| 6,009,402 A | 12/1999 | Whitworth |
| 6,113,493 A | 9/2000 | Walker et al. |
| 6,128,598 A | 10/2000 | Walker et al. |
| 6,529,723 B1 | 3/2003 | Bentley |

(Continued)

FOREIGN PATENT DOCUMENTS

| | | |
|---|---|---|
| AU | 2010204729 A1 | 9/2011 |
| AU | 2010249515 | 1/2012 |

(Continued)

OTHER PUBLICATIONS

Phillips, Dennis E. et al, "Supero: A Sensor System for Unsupervised Residential Power Usage Monitoring", Mar. 2013, p. 66 (Year: 2013).*

(Continued)

*Primary Examiner* — Christopher Bridges
(74) *Attorney, Agent, or Firm* — Dinsmore & Shohl LLP

(57) ABSTRACT

Systems, methods, apparatuses and computer-readable media for receiving data from one or more sensors associated with one or more home devices, such as appliances, home systems, etc. are presented. The data may be used to determine whether operation of the home device is within an acceptable range. If not, the user associated with the home device may receive an alert identifying a potential issue. One or more potential modifications to improve the home device may be identified and transmitted to the user. In some examples, an insurance incentive to implement the recommended modifications may also be transmitted to the user.

20 Claims, 7 Drawing Sheets

(56) References Cited

U.S. PATENT DOCUMENTS

| | | | |
|---|---|---|---|
| 6,552,647 B1* | 4/2003 | Thiessen | G05B 15/02 |
| | | | 219/448.11 |
| 6,561,903 B2 | 5/2003 | Walker et al. | |
| 6,575,234 B2 | 6/2003 | Nelson | |
| 6,583,720 B1* | 6/2003 | Quigley | G08B 25/016 |
| | | | 340/521 |
| 6,684,190 B1 | 1/2004 | Powers et al. | |
| 6,823,258 B2 | 11/2004 | Ukai et al. | |
| 6,853,958 B1 | 2/2005 | Turin et al. | |
| 6,950,801 B2 | 9/2005 | Brookes et al. | |
| 6,995,676 B2 | 2/2006 | Amacher | |
| 7,088,239 B2 | 8/2006 | Basinger et al. | |
| 7,203,654 B2 | 4/2007 | Menendez | |
| 7,230,528 B2 | 6/2007 | Kates | |
| 7,243,050 B2 | 7/2007 | Armstrong | |
| 7,263,450 B2 | 8/2007 | Hunter | |
| 7,292,155 B2 | 11/2007 | Vokey et al. | |
| 7,336,168 B2 | 2/2008 | Kates | |
| 7,339,483 B1 | 3/2008 | Farmer | |
| 7,467,065 B2 | 12/2008 | Neel et al. | |
| 7,605,696 B2 | 10/2009 | Quatro | |
| 7,610,210 B2 | 10/2009 | Helitzer et al. | |
| 7,630,986 B1 | 12/2009 | Herz et al. | |
| 7,688,215 B2 | 3/2010 | Vokey et al. | |
| 7,711,584 B2 | 5/2010 | Helitzer et al. | |
| 7,716,077 B1 | 5/2010 | Mikurak | |
| 7,769,608 B1* | 8/2010 | Woll | G06Q 40/08 |
| | | | 705/4 |
| 7,873,527 B2 | 1/2011 | Dordick et al. | |
| 7,941,330 B1 | 5/2011 | Buentello et al. | |
| 8,036,160 B1 | 10/2011 | Oakes, III | |
| 8,041,636 B1 | 10/2011 | Hunter et al. | |
| 8,046,244 B1 | 10/2011 | Yager et al. | |
| 8,077,927 B1 | 12/2011 | Maltby, II | |
| 8,106,769 B1 | 1/2012 | Maroney et al. | |
| 8,145,578 B2 | 3/2012 | Pershing et al. | |
| 8,265,964 B2 | 9/2012 | Read et al. | |
| 8,271,303 B2 | 9/2012 | Helitzer et al. | |
| 8,271,308 B2 | 9/2012 | Winkler | |
| 8,280,633 B1 | 10/2012 | Eldering et al. | |
| 8,289,160 B1 | 10/2012 | Billman | |
| 8,319,508 B2 | 11/2012 | Vokey | |
| 8,340,997 B2 | 12/2012 | Vandrilla et al. | |
| 8,359,211 B2 | 1/2013 | English et al. | |
| 8,364,609 B2 | 1/2013 | Ozog | |
| 8,374,729 B2 | 2/2013 | Chapel et al. | |
| 8,378,808 B1 | 2/2013 | Gwaltney | |
| 8,384,886 B2 | 2/2013 | Richardson et al. | |
| 8,400,299 B1 | 3/2013 | Maroney et al. | |
| 8,401,877 B2 | 3/2013 | Salvagio | |
| 8,401,896 B2 | 3/2013 | Wargin et al. | |
| 8,424,095 B2 | 4/2013 | Masuoka et al. | |
| 8,432,117 B2 | 4/2013 | Berman et al. | |
| 8,447,631 B2 | 5/2013 | Ren et al. | |
| 8,599,008 B2* | 12/2013 | Watson | H04L 43/0817 |
| | | | 340/5.1 |
| 8,649,987 B2* | 2/2014 | Steenberg | H04L 12/2825 |
| | | | 707/769 |
| 8,749,381 B1 | 6/2014 | Maroney et al. | |
| 8,760,258 B2 | 6/2014 | Marriam et al. | |
| 8,924,241 B2* | 12/2014 | Grosso | G06Q 10/00 |
| | | | 705/4 |
| 9,017,256 B2 | 4/2015 | Gottesman | |
| 9,426,293 B1 | 8/2016 | Oakes, III | |
| 2002/0010599 A1* | 1/2002 | Levison | G06Q 30/0207 |
| | | | 705/14.1 |
| 2002/0055861 A1 | 5/2002 | King et al. | |
| 2002/0095269 A1* | 7/2002 | Natalini | H04L 43/0817 |
| | | | 702/188 |
| 2002/0128882 A1 | 9/2002 | Nakagawa et al. | |
| 2004/0153362 A1* | 8/2004 | Bauer | G07C 5/008 |
| | | | 705/1.1 |
| 2004/0168086 A1 | 8/2004 | Young et al. | |
| 2005/0267900 A1 | 12/2005 | Ahmed et al. | |
| 2006/0033625 A1* | 2/2006 | Johnson | G06Q 40/08 |
| | | | 705/2 |
| 2006/0143056 A1 | 6/2006 | Taylor et al. | |
| 2006/0210753 A1 | 9/2006 | Kadlec | |
| 2007/0063075 A1 | 3/2007 | Kaplowitz | |
| 2007/0072541 A1 | 3/2007 | Daniels et al. | |
| 2007/0139191 A1 | 6/2007 | Quatro | |
| 2007/0258827 A1* | 11/2007 | Gierke | F04D 15/029 |
| | | | 417/44.11 |
| 2007/0282639 A1 | 12/2007 | Leszuk et al. | |
| 2008/0015906 A1 | 1/2008 | Fox | |
| 2008/0055096 A1 | 3/2008 | Aylward | |
| 2008/0058740 A1 | 3/2008 | Sullivan et al. | |
| 2008/0065427 A1 | 3/2008 | Helitzer et al. | |
| 2008/0234878 A1 | 9/2008 | Joao | |
| 2008/0319786 A1 | 12/2008 | Stivoric et al. | |
| 2009/0037230 A1 | 2/2009 | Tracy et al. | |
| 2009/0157437 A1 | 6/2009 | Becerra et al. | |
| 2009/0265193 A1 | 10/2009 | Collins et al. | |
| 2010/0042442 A1 | 2/2010 | Seitomer et al. | |
| 2010/0057544 A1 | 3/2010 | Tarbell et al. | |
| 2010/0082174 A1 | 4/2010 | Weaver | |
| 2010/0145734 A1 | 6/2010 | Becerra et al. | |
| 2010/0153140 A1 | 6/2010 | Helitzer et al. | |
| 2010/0174566 A1 | 7/2010 | Helitzer et al. | |
| 2010/0191487 A1* | 7/2010 | Rada | H02J 3/01 |
| | | | 707/E17.014 |
| 2010/0217642 A1 | 8/2010 | Crubtree et al. | |
| 2010/0225341 A1 | 9/2010 | Burrows et al. | |
| 2010/0228588 A1 | 9/2010 | Nielsen et al. | |
| 2010/0235019 A1 | 9/2010 | Fini et al. | |
| 2010/0277315 A1 | 11/2010 | Cohn et al. | |
| 2011/0040666 A1 | 2/2011 | Crabtree et al. | |
| 2011/0161118 A1 | 6/2011 | Borden et al. | |
| 2011/0161119 A1 | 6/2011 | Collins | |
| 2011/0191125 A1 | 8/2011 | Patton | |
| 2011/0217681 A1 | 9/2011 | Krejcarek | |
| 2011/0251807 A1 | 10/2011 | Rada et al. | |
| 2011/0251868 A1 | 10/2011 | Mikurak | |
| 2011/0270773 A1 | 11/2011 | Siekman et al. | |
| 2011/0311370 A1* | 12/2011 | Sloss | F04B 49/065 |
| | | | 417/1 |
| 2012/0016695 A1 | 1/2012 | Bernard et al. | |
| 2012/0071731 A1 | 3/2012 | Gottesman | |
| 2012/0101852 A1 | 4/2012 | Albert | |
| 2012/0109692 A1 | 5/2012 | Collins et al. | |
| 2012/0123806 A1 | 5/2012 | Schumann, Jr. et al. | |
| 2012/0173290 A1* | 7/2012 | Collins | G06Q 40/08 |
| | | | 705/4 |
| 2012/0188080 A1 | 7/2012 | Haupt et al. | |
| 2012/0209442 A1 | 8/2012 | Ree | |
| 2012/0223965 A1 | 9/2012 | Pershing | |
| 2012/0233012 A1 | 9/2012 | Scruton et al. | |
| 2012/0239581 A1 | 9/2012 | Mosher | |
| 2012/0259666 A1 | 10/2012 | Collopy et al. | |
| 2012/0259722 A1 | 10/2012 | Mikurak | |
| 2012/0280814 A1 | 11/2012 | Beale et al. | |
| 2012/0284058 A1 | 11/2012 | Varanasi et al. | |
| 2012/0290333 A1 | 11/2012 | Birchall | |
| 2012/0310854 A1 | 12/2012 | Cova et al. | |
| 2012/0330690 A1 | 12/2012 | Goslinga et al. | |
| 2013/0006676 A1 | 1/2013 | Helitzer et al. | |
| 2013/0020098 A1 | 1/2013 | Bui | |
| 2013/0024029 A1 | 1/2013 | Tran et al. | |
| 2013/0030845 A1 | 1/2013 | Brown | |
| 2013/0055661 A1 | 3/2013 | McGillycuddy | |
| 2013/0096954 A1 | 4/2013 | Bodas | |
| 2013/0103416 A1 | 4/2013 | Amigo et al. | |
| 2013/0103433 A1 | 4/2013 | Corben et al. | |
| 2013/0144658 A1* | 6/2013 | Schnabolk | G06Q 50/163 |
| | | | 705/4 |
| 2013/0201018 A1* | 8/2013 | Horstemeyer | F24C 7/085 |
| | | | 340/539.14 |
| 2013/0297353 A1 | 11/2013 | Strange et al. | |
| 2014/0136242 A1* | 5/2014 | Weekes | G06Q 40/08 |
| | | | 705/4 |
| 2014/0167969 A1 | 6/2014 | Wedig et al. | |
| 2014/0180725 A1 | 6/2014 | Ton-That et al. | |

(56) References Cited

U.S. PATENT DOCUMENTS

| | | | | |
|---|---|---|---|---|
| 2014/0201315 | A1* | 7/2014 | Jacob | H04L 67/02 709/217 |
| 2014/0202243 | A1* | 7/2014 | Leonard | F04B 51/00 73/168 |
| 2014/0207497 | A1 | 7/2014 | Collins et al. | |
| 2014/0257862 | A1 | 9/2014 | Billman et al. | |
| 2014/0266287 | A1 | 9/2014 | Reeder, III | |
| 2015/0039466 | A1 | 2/2015 | Skinner et al. | |
| 2015/0112543 | A1 | 4/2015 | Binion et al. | |
| 2015/0112545 | A1 | 4/2015 | Binion et al. | |
| 2015/0112730 | A1 | 4/2015 | Binion et al. | |
| 2015/0112731 | A1 | 4/2015 | Binion et al. | |
| 2015/0134369 | A1 | 5/2015 | Sakata et al. | |
| 2015/0161538 | A1 | 6/2015 | Matus et al. | |
| 2015/0187014 | A1 | 7/2015 | Adams et al. | |
| 2015/0208986 | A1 | 7/2015 | Gottesman | |
| 2015/0254781 | A1 | 9/2015 | Binion et al. | |
| 2016/0086285 | A1 | 3/2016 | Jordan Peters et al. | |
| 2016/0171521 | A1 | 6/2016 | Ramirez et al. | |
| 2016/0189442 | A1 | 6/2016 | Wright | |

FOREIGN PATENT DOCUMENTS

| | | |
|---|---|---|
| AU | 2009201575 | 11/2012 |
| CA | 2713702 A1 | 8/2009 |
| CA | 2812395 A1 | 2/2012 |
| CN | 202348008 U | 7/2012 |
| EP | 0368890 A1 | 5/1990 |
| EP | 1297470 A1 | 4/2003 |
| EP | 1762845 A2 | 3/2007 |
| EP | 2116968 A1 | 11/2009 |
| EP | 2435972 A1 | 4/2012 |
| JP | S61-191944 U | 11/1986 |
| WO | 2002035494 A1 | 5/2002 |
| WO | 2004063855 A2 | 7/2004 |
| WO | 2009018650 A1 | 2/2009 |
| WO | 2009114199 A2 | 9/2009 |
| WO | 2009129496 A2 | 10/2009 |
| WO | 2010062899 A1 | 6/2010 |
| WO | 2012063268 A2 | 5/2012 |
| WO | 2012135325 A2 | 10/2012 |
| WO | 2013043724 A1 | 3/2013 |

OTHER PUBLICATIONS

Aman, Saima et al., "Energy Management Systems: State of the Art and Emerging Trends", Jan. 2013, p. 117 (Year: 2013).*
"Extended Vehicle Protection from Assurant Solutions," USAA, dated Jun. 3, 2013 <https://www.usaa.com/inet/pages/extended_vehicle_protection_program_main_page?wa_ref=pubinsmain_EV_LM&aakredirect=true>.
"Hassle-Free Home Security," Scout, dated Jun. 3, 2013. <www.scoutalarm.com>.
"Home Security Systems," Reviews.com, Jun. 3, 2013. <www.reviews.com/home-security-systems/>.
"Professional Alarm Monitoring onl $8.95 a month," Smarthome, Jun. 3, 2013, <www.smarthome.com/alarm.html>.
"Common Questions About Home Insurance," Association of British Insurers, dated Apr. 2012.
"Preventing Costly Water Damage to Your Home and Belongings—Are Water Sensor Systems Right for You?," Allstate, dated Jun. 3, 2013. <www.allstate.com/tools-and-resources/be-aware-and-prepare/water-damage-prevetion.aspx>.
"Protecting Yourself and Your Home with Liberty Mutual," Liberty Mutual Insurance—Home Insurance Coverages, dated Jun. 3, 2013.
"Weather Station Installation Guide", Ambient Weather, downloaded from <www.ambientweather.com/eaofin.html> on Jun. 6, 2013.
"Green Roof Monitoring", HOBO Data Loggers—Onset, downloaded from <www.onsetcomp.com/green-roof-monitoring> on Jun. 6, 2013.
"Experts answer tornado questions", USA Today, downloaded from <www.usatoday.com> on Jun. 5, 2013.
"Guidelines for Smart Grid Cyber Security: Vol. 2, Privacy and the Smart Grid", The Smart Grid Interoperability Panel—Cyber Security Working Group, Aug. 2010.
"Physical Security", FM 3-19.30, U.S. Department of the Army, Jan. 8, 2001.
"Now Smart Homes Get Smart Discounts", PRNewswire, Dec. 3, 2013.
Nov. 17, 2016—U.S. Non-Final Office Action—U.S. Appl. No. 14/186,222.
Dennis E. Phillips et al., "Supero: A Sensor System for Unsupervised Residential Power Usage Monitoring", Mar. 2013, Department of Computer Science and Engineering, Michigan State University, Advanced Digital Sciences Center and Purdue University, entire document.
Saima Aman et al., "Energy Management Systems: State of the Art and Emerging Trends", Jan. 2013, University of Southern California, entire document.
Feb. 3, 2017—U.S. Non-Final Office Action—U.S. Appl. No. 14/186,187.
Mar. 6, 2017—U.S. Final Office Action—U.S. Appl. No. 14/186,222.
Jun. 15, 2017—U.S. Office Action—U.S. Appl. No. 14/186,187.
Aug. 17, 2017—U.S. Non-Final Office Action—U.S. Appl. No. 14/186,222.
Oct. 17, 2017—U.S. Office Action—U.S. Appl. No. 14/186,187.
Feb. 6, 2018—U.S. Final Office Action—U.S. Appl. No. 14/186,222.
Feb. 8, 2018—U.S. Final Office Action—U.S. Appl. No. 14/186,187.
May 30, 2018—U.S. Non-Final Office Action—U.S. Appl. No. 14/186,187.
May 30, 2018—U.S. Non-Final Office Action—U.S. Appl. No. 14/186,222.
Oct. 30, 2018—U.S. Final Office Action—U.S. Appl. No. 14/186,187.
Oct. 30, 2018—U.S. Final Office Action—U.S. Appl. No. 14/186,222.
Feb. 27, 2019—U.S. Notice of Allowance—U.S. Appl. No. 14/186,187.
Cassie Peterson, "9 Ways to Make Money with smartHOME Technologies" SDM Magazine http://www.sdmmag.com/articles/89523-ways-to-make-money-with-smarthome-technologies Aug. 1, 2013, pp. 1-10.
Apr. 1, 2019—U.S. Notice of Allowance—U.S. Appl. No. 14/186,187.
May 9, 2019—U.S. Notice of Allowance—U.S. Appl. No. 14/186,222.
Jun. 10, 2020—U.S. Notice of Allowance—U.S. Appl. No. 16/458,463.
Lisota, Kevin, "Review: At home with Wally, a new sensor network for detecting water leaks" Feb. 26, 2014, https://www.geekwire.com/2014/review-home-test-wally-water-leak-sensor-network/ (via the internet archives. (Year: 2014).
Aug. 31, 2020—U.S. Non-Final Office Action—U.S. Appl. No. 16/559,200.
Feb. 17, 2021—U.S. Notice of Allowance—U.S. Appl. No. 16/559,200.
Kevin Lisota, "Review: At home with Wally, a new sensor network for detecting water leaks" Feb. 26, 2014, https://www.geekwire.com/2014/review-home-test-wally-water-leak-sensor-network/ (via the internet archives). (Year: 2014).

* cited by examiner

HOME DEVICE SENSING

CROSS REFERENCE TO RELATED APPLICATIONS

This application is a continuation of and claims priority to co-pending U.S. application Ser. No. 14/027,539, filed Sep. 16, 2013, and entitled "Home Device Sensing," which is incorporated herein by reference in its entirety.

TECHNICAL FIELD

Aspects of the disclosure generally relate sensing of one or more home devices. In particular, various aspects described herein relate receiving data from one or more sensors associated with one or more home devices and using the data to identify abnormalities in operation of the home device. The data may then be used to alert the user associated with the home device and/or adjust insurance rates.

BACKGROUND

People are often looking for ways to protect their homes. People buy insurance for exactly that reason—to protect against unforeseen risks. However, although insurance will pay for damage to your home, vehicle, etc. after it occurs, being aware of a potential risk before damage occurs may aid in reducing inconvenience and costs. Further, even if a person is aware of a potential risk, failure, etc., the person may not have enough information to determine how to fix the issue or may not fully comprehend the potential severity of the issue.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for receiving data from one or more sensors associated with one or more home devices, such as appliances, home systems, etc. The data may be used to determine whether operation of the home device is within an acceptable range. If not, the user associated with the home device may receive an alert identifying a potential issue. One or more potential modifications to improve the home device may be identified and transmitted to the user. In some examples, an insurance incentive to implement the recommended modifications may also be transmitted to the user.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
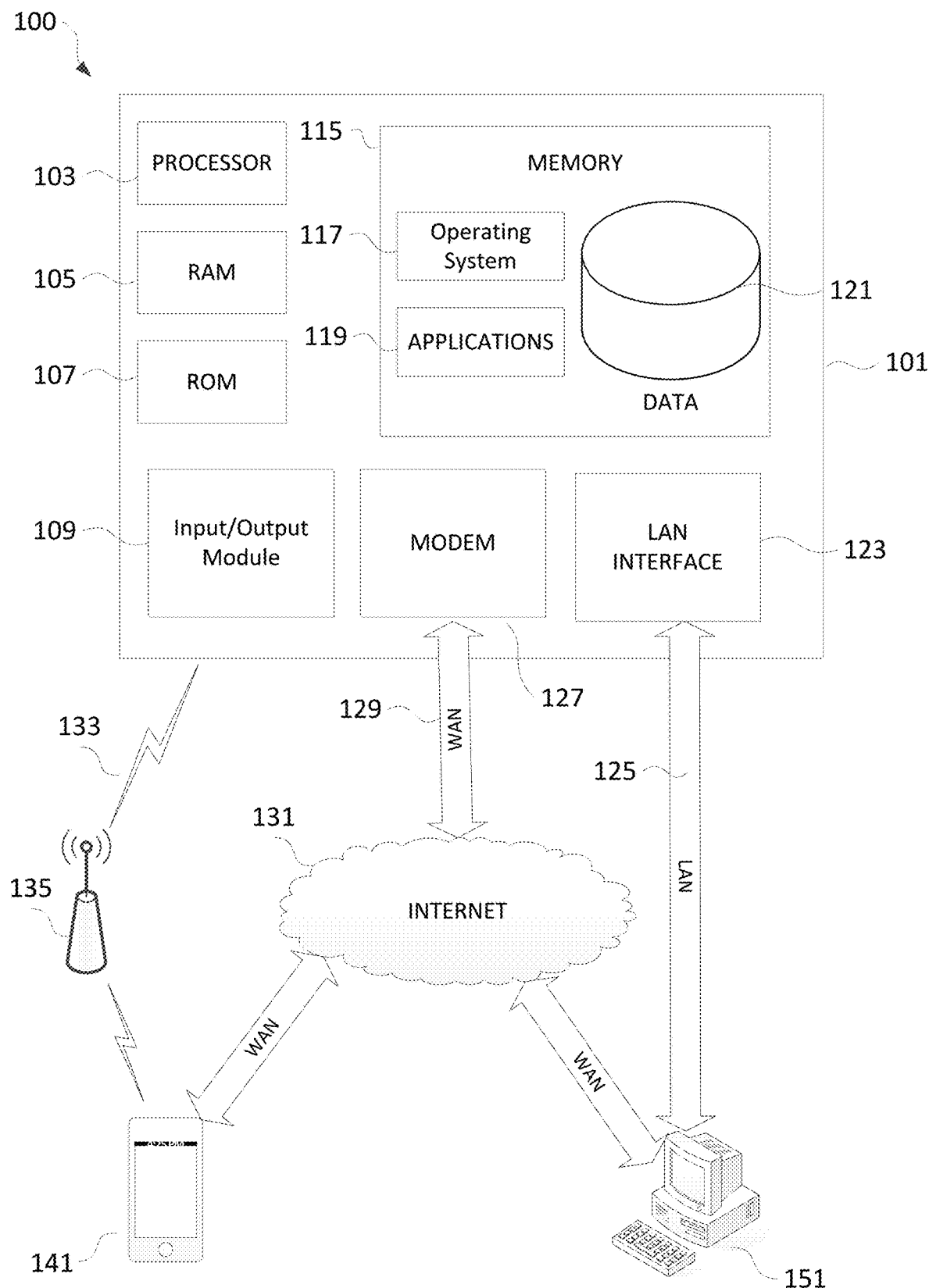
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as various servers or systems, such as a home device sensing system, configured as described herein for receiving data associated with one or more home devices, to determine whether the operation of these devices is within an acceptable range, and identify any potential issues or failures.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a home device, determine one or more recommended modifications to improve operation of the home device and/or generate an incentive to implement the recommended modifications.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the home device sensing system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the home device sensing system 101 may include computer-executable instructions (e.g., home device characteristic data analysis, etc.) for receiving data associated with a home device of a user, analyzing the data to determine whether it is within a predefined threshold, and/or generating an alert based on the received data.

The systems described herein may be used by an insurance company, financial institution or other entity to monitor one or more home devices and/or systems and identify potential issues or failures, either after the failures or prior to the failures occurring. Although many examples herein will be described as being used in conjunction with an insurance company, the systems and methods described herein may be used by or with other entities or types of entities without departing from the invention.

Figure 2:
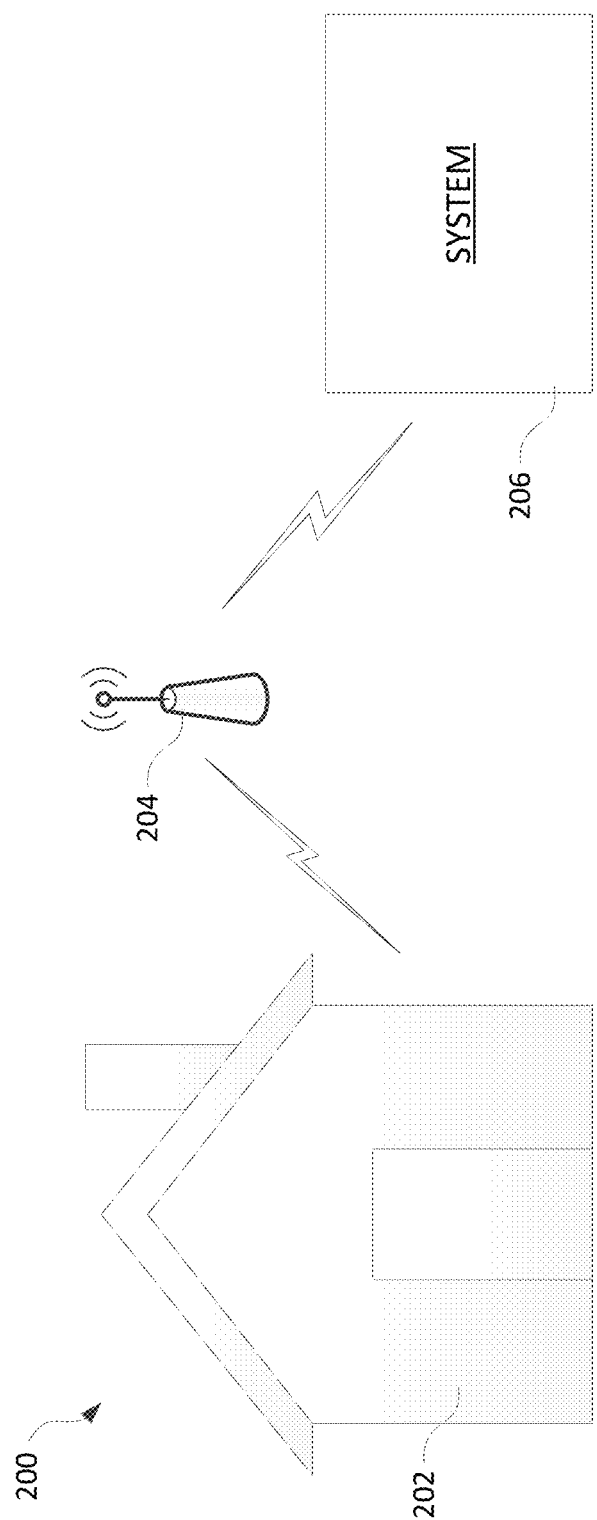
FIG. 2 is a schematic diagram of an example home device sensing system according to one or more aspects described herein.

In some arrangements, a home device sensing system may be implemented by an entity. In some examples, the entity may be an insurance company. FIG. 2 is a schematic illustration of one home device sensing system arrangement according to one or more aspects described herein. The arrangement 200 may include a home 202. The home generally includes a variety of systems, appliances, etc. that may be monitored by the home device sensing system described herein. For instance, one or more sensors or sensing devices may be arranged on or integrated into devices such as hot water heaters, refrigerators, washing machines, dryers, furnaces, air conditioning units, and the like. Various arrangements described herein will be described in terms of a sump pump being monitored by one or more sensing devices. However, nothing in the disclosure should be viewed as limiting the home device sensing system to use only with sump pumps.

The home 202 depicted in FIG. 2 may include a plurality of appliances and/or systems and one or more of the appliances and/or systems (e.g., devices) may be monitored by one or more sensing devices, as will be described more fully below. Signals from the one or more sensing devices may be transmitted to the home device sensing system 206 at an entity, such as an insurance company. In some examples, the signals may be wirelessly transmitted and may be transmitted to a base collection unit 204 prior to transmission to the system 206. Alternatively, the signals may be transmitted directly to the system, via wired or wireless means. In some arrangements, the data may be collected in real-time and/or transmitted in real-time. Additionally or alternatively, the data may be collected and/or transmitted in batches.

Figure 3:
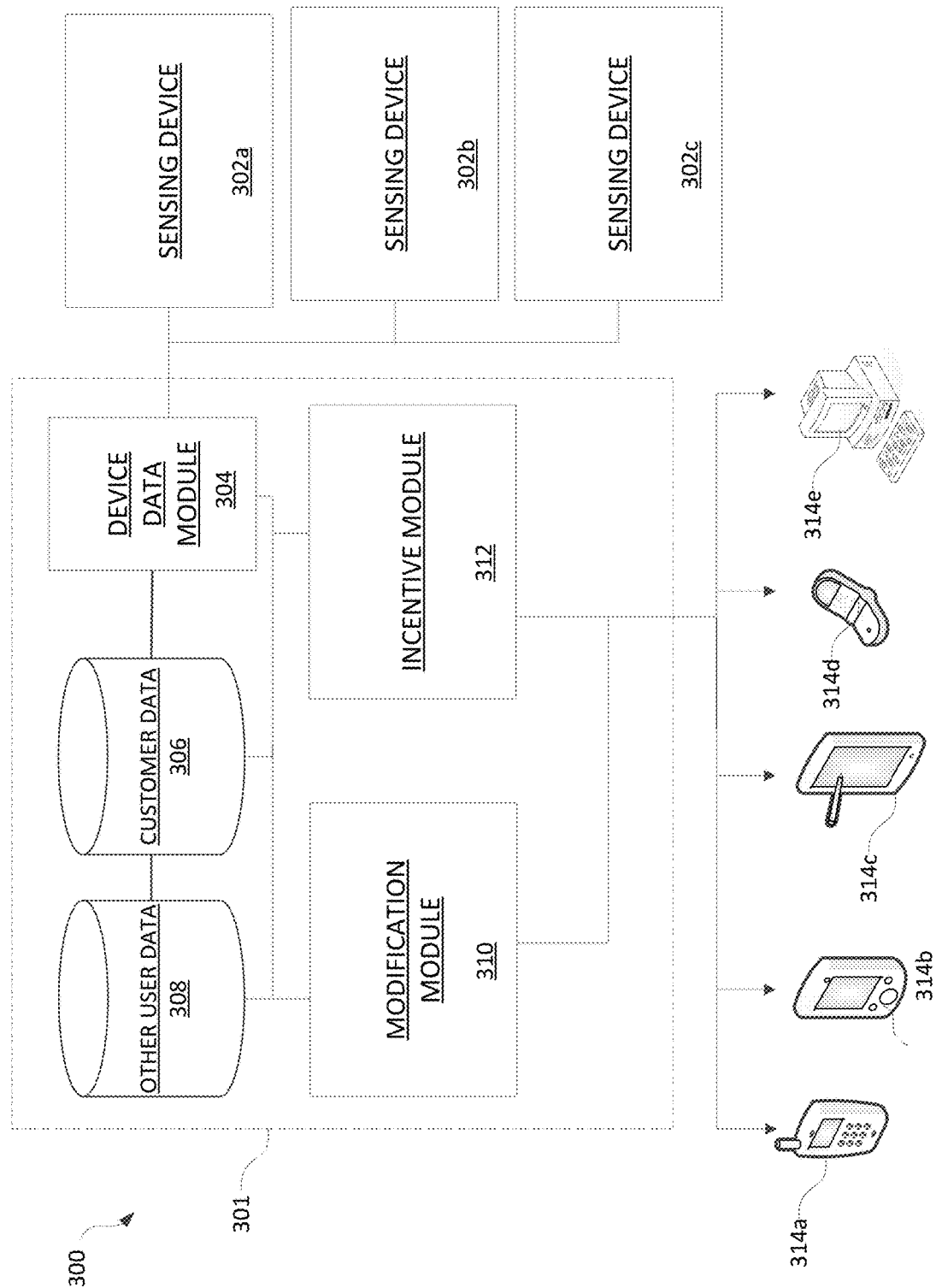
FIG. 3 is an example home device sensing system according to one or more aspects described herein.

FIG. 3 illustrates one example of a home device sensing system 300. Each component shown in FIG. 3 may be implemented in hardware, software or a combination of the two. Additionally, each component of the home device sensing system may include a computing device (or system) having some or all of the structural components described above for computing device 101.

The home device sensing system 300 may be associated with an entity 301. For instance, the system 300 may be implemented by an entity 301, such as an insurance company. In other examples, the system 300 may be implemented by various other types of companies, universities, government entities, and the like. Several examples discussed herein will be described in the context of an insurance company. However, nothing in the disclosure should be viewed as limiting the systems, methods, computer-readable media, and the like, described herein to use with insurance companies.

The home device sensing system 300 may include a plurality of sensing devices 302a-302c. The sensing devices 302a-302c may be a variety of types of devices and may be used to monitor or sense one or more characteristics of a home device, such as an appliance, system, etc. For instance, the sensing devices 302a-302c may include power sensors, a float switches, and/or moisture sensors. In other examples, the sensing devices 302a-302c may include devices for sensing temperature, sewage backup, natural gas, propane, etc., air quality (e.g., carbon monoxide, etc.), air flow quality, water flow, and the like. Various other types of sensing devices and/or characteristics may be monitored via sensing devices 302a-302c.

The one or more sensing devices 302a-302c may be connected to or in communication with one or more home devices, such as appliances, systems, etc., to monitor one or more characteristics of the home device. For instance, home devices such as a sump pump, roof, attic (e.g., air flow in attic), water heater, washing machine, dryer, refrigerator, freezer, air conditioner, furnace, and the like, may be monitored. Various other appliances and/or systems may be monitored without departing from the invention.

Although the home device sensing system 300 includes three sensing devices 302a-302c, the system may include more or fewer sensing devices without departing from the invention. Further, in some examples, each sensing device may be a different type of device and/or may be configured to monitor different characteristics of the home device (e.g., sensing device 302a detects moisture while sensing device 302b detects power consumption). Additionally or alternatively, each sensing device 302a-302c may be connected to or in communication with a different home device, or multiple sensing devices 302a-302b may be connected to or in communication with a single home device such that multiple, different characteristics of the home device are being monitored (e.g., simultaneously). This may permit additional and/or more accurate information to be collected about the home device.

Signals and/or data from the sensing devices 302a-302c may be received by the home device sensing system 300. For instance, signals and/or data may be transmitted from the sensing device 302a-302c to the system 300 via wired or wireless transmission. In some examples, the data and/or signals may be transmitted to a base unit for collection prior to transmission to the system 300 or entity 301 associated with the system. In other examples, the data and/or signals may be transmitted directly from each sensor 302 to the system 300 or entity 301.

The signals and/or data from the sensing device 302a-302c may be received by a device data module 304. The device data module 304 may include one or more computing devices containing many or all of the hardware/software components of computing device 101 in FIG. 1. The device data module 304 may include hardware, software, and network components to receive and/or transmit information to and/or from various computing devices, modules, databases, and the like.

The device data module 304 may be configured to perform a set of functions within the home device sensing system 300. For instance, the device data module 304 may collect data and/or signals received from the sensing devices 302a-302c and may include one or more algorithms which may be executed by one or more software applications running on generic or specialized hardware within the home device sensing system 300 to determine whether the data received is at, above or below one or more predefined thresholds. For instance, the device data module 304 may determine whether data received from a sensing device indicating power consumption is at, above, or below a predetermined power consumption threshold. Additionally or alternatively, the device data module 304 may determine whether to store data received from the sensing device 302a-302c, such as in customer data storage 306. Customer data storage 306 may be organized in any of several different manners. For example, a table in customer data storage 306 may include a listing of the various home devices associated with a user, historical data of each home device received from one or more sensors, etc.

In still other examples, the device data module 304 may aggregate and/or compare data received from sensing devices 302a-302c with other data, such as data stored in other user database 308. Other user database 308 may be organized in any of several different manners. For example, a table in the other user database 308 may include a listing of various users, home devices associated with each user, historical data of the home devices, current or recent weather data, historical weather data, and the like. Other user database 308 may include data received from other users having sensing devices similar to sensing devices 302a-302c. Additionally or alternatively, the other users may be associated with the entity implementing the system (e.g., the users may be customers of the insurance company). In still other examples, the other user data may include publicly available data such as weather data, and the like.

In some arrangements, the data may be compared based on location. For instance, the data received from sensing device 302a-302c may be compared with data for users within a predefined proximity (e.g., 1 mile, 3 miles, 5 miles, a zip code, etc.) to determine characteristics of that particular area, locality, neighborhood, etc. For instance, if the data received indicates that sump pumps of several users within the predefined proximity runs more frequently than a norm, that may indicate one or more characteristics of the water table in that area. In another example, received sensor data may indicate that a flood or high water sensor has been activated. However, weather data for that locality may indicate that it is not currently raining and/or that it has not rained for period of time. Accordingly, this information may be aggregated and analyzed (e.g., by the system) to determine that there may be a flood or that there may be a malfunction of one or more sensors. In some examples, this information may be used to determine, adjust, etc. one or more insurance rates and/or premiums for the area (e.g., some data may indicate increased or decreased risk and thus the rates may be adjusted accordingly).

The home device sensing system may further include a modification module 310. The modification module may be implemented in hardware and/or software configured to perform a set of functions within the home device sensing system 300. The modification module 310 may receive data and may include one or more algorithms which may be executed by one or more software applications running on generic or specialized hardware within the home device sensing system 300 to, based on the determinations and/or comparisons made by the device data module 304, identify one or more improvements that may be made to the home device being monitored. For instance, if data indicates that a sump pump runs more frequently than other sump pumps (e.g., power consumption above a predetermined threshold, run time above a predetermined threshold, etc.), it may indicate an issue with the sump pump or a potential failure of the sump pump (e.g., motor may fail due to overuse). Accordingly, the modification module 310 may determine that it would be advantageous (e.g., to prevent failure and potential flood risk) to replace the pump and/or service the pump.

In some examples, this identified modification may be communicated to individuals associated with the entity (e.g., an insurance agent representing the customer, etc.) and/or the user. For instance, an alert may be issued to the agent and/or user indicating the increased power consumption associated with the home device and recommending service and/or replacement. The alert may be issued via one or more computing devices, such as devices 314. For instance, the alert may be transmitted to one or more of a smartphone 314a, personal digital assistant (PDA) 314b, a tablet computing device 314c, a cell phone 314d and/or a terminal or other computing device 314e. Various other types of devices may also be used without departing from the invention. For instance, the alert may be transmitted via a user interface in a vehicle of a homeowner. In some examples, the alert may be transmitted via email, short messaging service (SMS), social media, and the like. In some arrangements, the alert may be presented to a user upon logging in to a website associated with the entity. In still other examples, the computing device receiving and/or displaying the alert may be located within a vehicle of the user (e.g., a user interface on a vehicle information screen).

The home device monitoring system 300 may further include incentive module 312. The incentive module 312 may be implemented in hardware and/or software configured to perform a set of specific functions within the home device sensing system 300. For example, the incentive module may receive data and may include one or more algorithms which may be executed by one or more software applications running on generic or specialized hardware within the home device sensing system 300 to, based on the determinations made by device data module 304 and/or modifications identified by modification module 310, identify one or more incentives to implement the proposed modifications. For instance, the incentive module 312 may generate a discount on an insurance premium or deductible if the user implements one or more modifications suggested to the user. In other examples, the incentive module 312 may indicate an impending increase in an insurance premium if the modifications are not implemented (e.g., rates will increase due to increased risk indicated by received data). Various other types of incentives may be provided without departing from the invention.

The proposed incentive may be communicated to individuals associated with the entity (e.g., an insurance agent representing the customer, etc.) and/or the user. For instance, an alert may be issued to the agent and/or user indicating the proposed incentive. The alert may be issued via one or more computing devices 314a-314e. Various other types of devices may also be used without departing from the invention. In some examples, the alert may be transmitted via email, SMS, social media, and the like. In some arrangements, the alert may be presenting to a user upon logging in to a website associated with the entity.

The home device sensing systems 200 and 300 of FIGS. 2 and 3 may include the components described in a single system or device or may be embodied in separate devices or systems. For instance, each component of the systems 200 or 300 may be implemented in hardware, software, or a combination of the two. Further, each component may be an individual component, physically separate from one or more other components, or may be combined in a single physical unit with one or more other components.

Further descriptions and examples of the algorithms, functions, and analyses that may be executed using systems 200 and 300 and associated components are described below in reference to the remaining figures.

Figure 4:
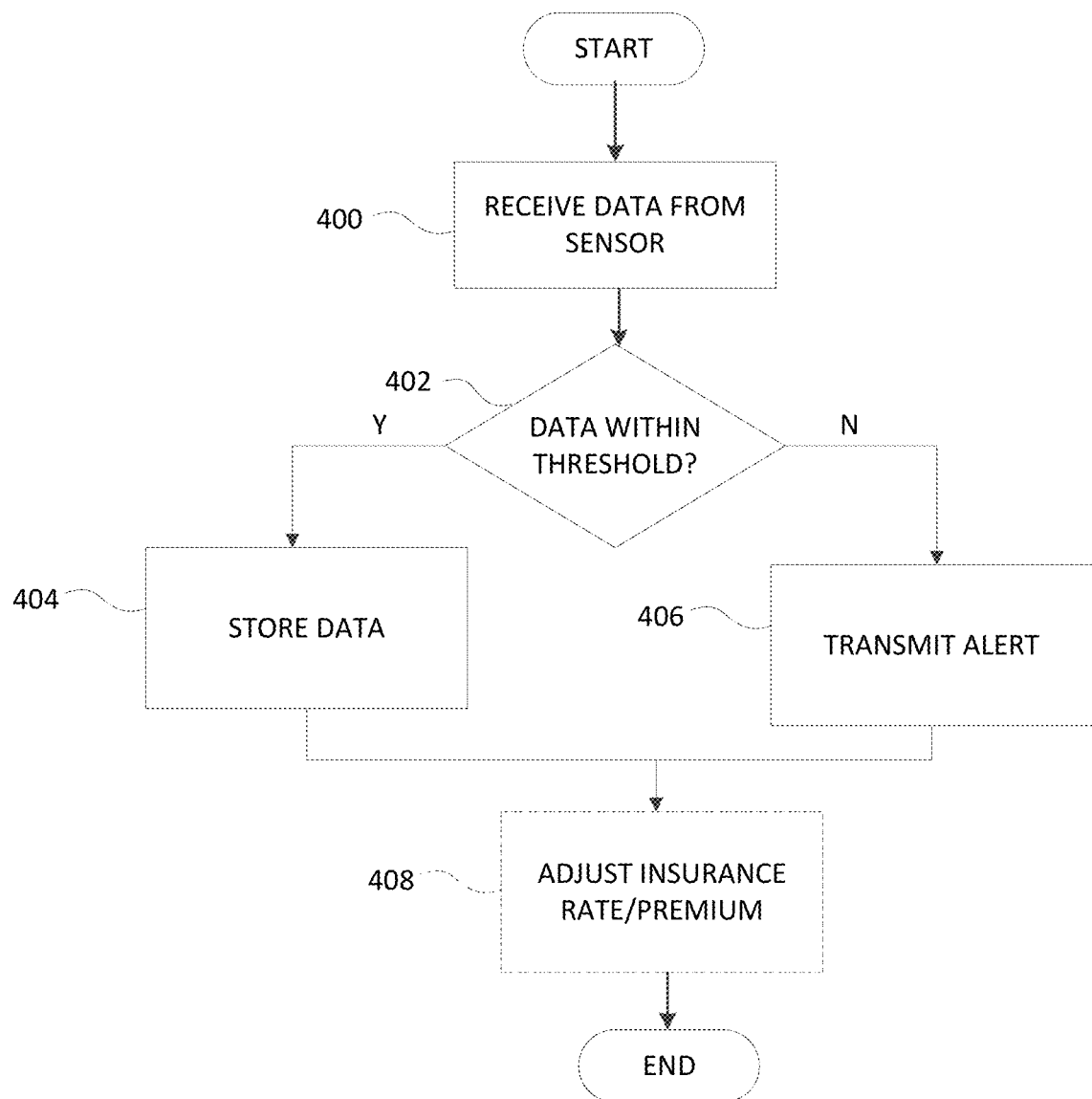
FIG. 4 is a flow chart illustrating one example method of implementing a home device sensing system according to one or more aspects described herein.

FIG. 4 illustrates one example method of implementing a home device sensing system according to one or more aspects described herein. In step 400, data is received from one or more sensors associated with a home device. As discussed above, the sensors may be different types of sensors configured to monitor different characteristics of a home device. In step 402, a determination is made as to whether the received data is within a predetermined threshold. For instance, if the received data is moisture data, a determination is made as to whether the detected amount of moisture is outside a predetermined threshold for an acceptable amount of moisture to be detected. In another example, the received data may be power consumption and a determination may be made as to whether the power consumed by the home device is within a predetermined threshold of acceptable power consumption. Additionally or alternatively, the received data may be compared to previously stored (e.g., historical data) for that home device and the determination may be made as to whether the received data is within a predetermined threshold of the historical data (e.g., the sump pump is running more often than it has in the past, more moisture is detected than was present in previous data, etc.).

If, in step 402, it is determined that the received data is within the predefined threshold, the data may be stored for future use, comparison, etc., as indicated by step 404. For instance, the data received may be determined to be within an acceptable range and thus may be stored for future use. If, in step 402, a determination is made that the data received is outside the predetermined threshold, an alert may be generated and transmitted in step 406. For instance, an alert may be generated indicating the home device being monitored and the characteristic that is determined to be outside of the predetermined threshold. For instance, the alert may be generated indicating that the data received from the sump pump indicates higher than a predefined threshold of acceptable power consumption, acceptable moisture levels, etc.

The alert may then be transmitted to a user and/or an individual associated with the entity implementing the system (e.g., an insurance agent of the insurance company implementing the system). The alert may simply notify the user and/or agent of the potential issue with the home device.

In optional step 408, an insurance rate, premium, etc. of the user may be adjusted based on the received data. This step may be implemented based on data that is determined to be within the predetermined threshold or outside of the predetermined threshold. For instance, if the data is determined to be within the predetermined threshold, this data may be used to adjust insurance rates or premiums for the user based on the received data, any historical data, etc. For example, if the data received is within a predetermined threshold (or consistently within the predetermined threshold over a period of time), a user's rates or premium may be reduced because of a reduced risk evidenced by the received data. Alternatively, if the data is outside the predetermined threshold (or consistently outside of the threshold), the risk may be higher (e.g., greater risk of failure of the sump pump and associated flooding). Accordingly, those rates or premium may be increased to account for the increased risk.

Figure 5:
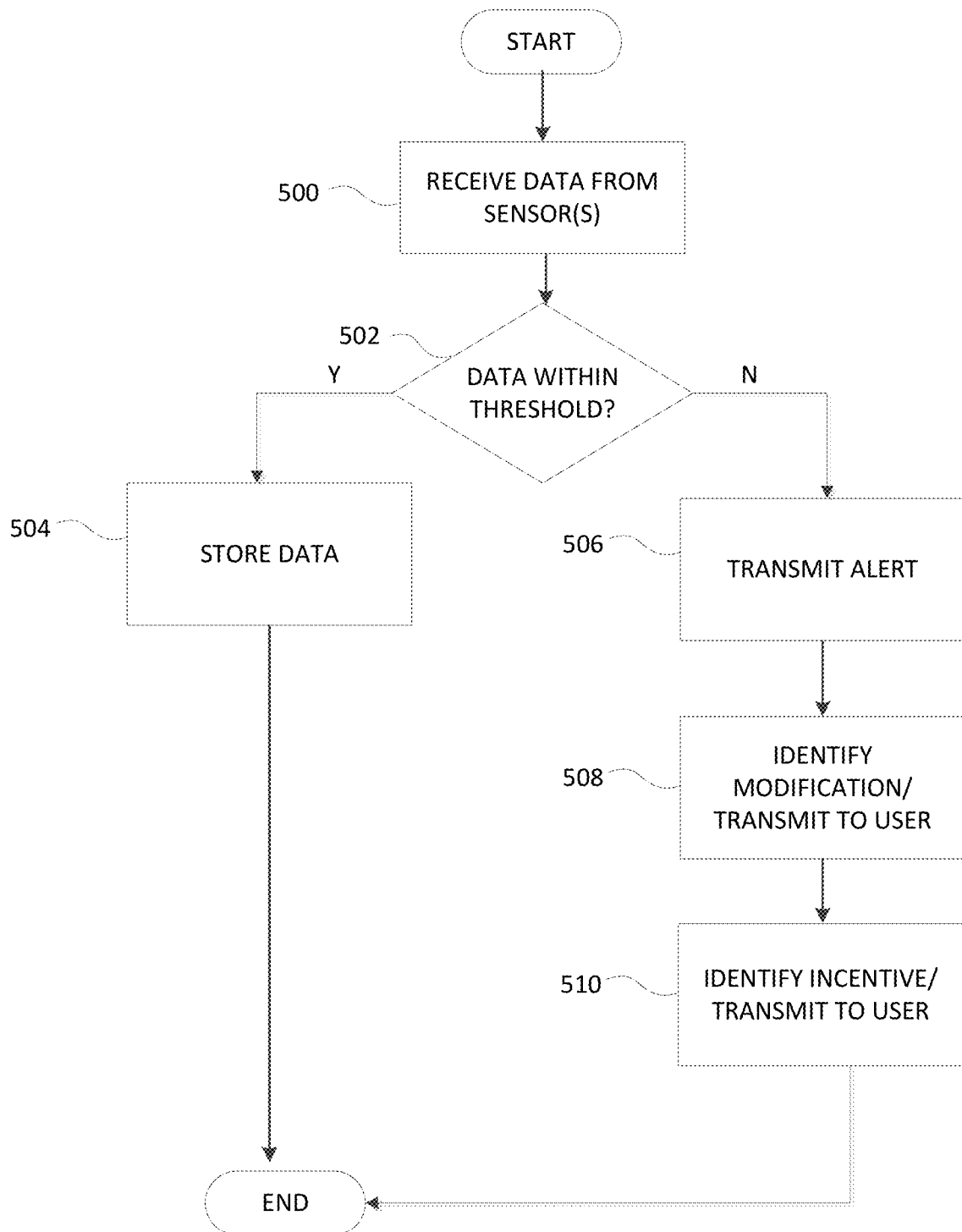
FIG. 5 is a flow chart illustrating another example method of implementing a home device sensing system according to one or more aspects described herein.

FIG. 5 illustrates another example method of implementing a home device sensing system according to one or more aspects described herein. In step 500, data may be received from one or more sensors. In step 502, a determination may be made as to whether the received data is within a predetermined threshold. This determination may be similar to step 402 in FIG. 4. If, in step 502, the data is determined to be within the predetermined threshold, the data may be stored in step 504 for future use.

If, in step 502, it is determined that the data is outside of the predetermined threshold, an alert may be generated and transmitted in step 506. The alert may be similar to the alert generated and transmitted in step 406 in FIG. 4 as described above. In step 508, one or more modifications may be identified based on the received data and the determination that the data is outside of the predetermined threshold. For instance, one or more modifications for the home device being monitored may be determined that may improve operation of the device, reduce risk associated with the device, etc. For instance, one or more proposed modifications may include servicing the home device and/or replacing the home device. Various other modifications may be identified. The proposed modification may be transmitted to the user and/or an individual associated with the entity implementing the system (e.g., an insurance agent). The modification may be suggested to the user in order to reduce risk of failure associated with the device being monitored.

In step 510, one or more incentives for implementing the identified modification may be determined and/or transmitted to the user. For instance, the user may receive an incentive (e.g., reduction in insurance rate, deductible, etc.) for implementing one or more of the recommended modifications. As discussed above, the recommended modifications and/or incentives may be transmitted to the user via one or more computing devices.

Figure 6:
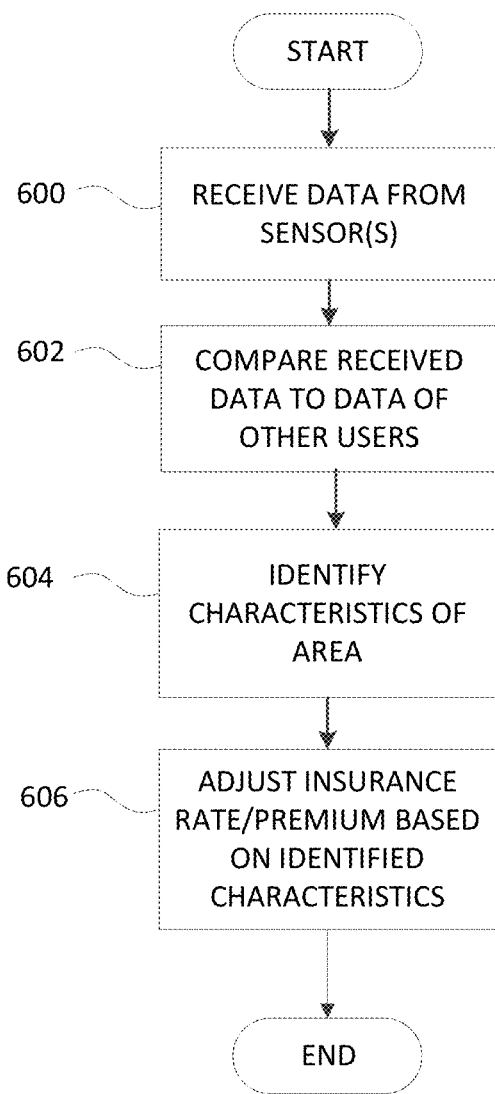
FIG. 6 is a flow chart illustrating yet another example method of implementing a home device sensing system according to one or more aspects described herein.

FIG. 6 illustrates yet another method of implementing a home device sensing system according to one or more aspects described herein. In step 600, data associated with a user may be received from one or more sensor(s). In step 602, the received data may be compared to data associated with other users. For instance, the received data may be compared to data associated with the same or similar home device of another user. In some examples, the other users may be customers of the same insurance company. The other data used for comparison may be data received from sensors similar to the arrangements described above, may be self-reported by the other users, may be publicly available, and the like. Various sources of comparison data may be used without departing from the invention.

In some arrangements, the received data may be compared with data of other users within a predefined proximity of the user. For instance, the received data may be compared with data of other users on the same street, in the same zip code, within a predefined radius (e.g., 1 mile, 3 miles, etc.) of the user, and the like.

This comparison may be used to identify one or more characteristics of a neighborhood, area, locality, etc. in step 604. For instance, the comparison may aid in determining a level of a water table of an area which may be indicative of a likelihood of flooding in that area. This information may then be used, in step 606, to adjust an insurance rate or premium for one or more users (e.g., customers) within the area. For instance, the insurance rates for users within the area may be increased or decreased based on the collective data gathered from the sensing units.

Figure 7:
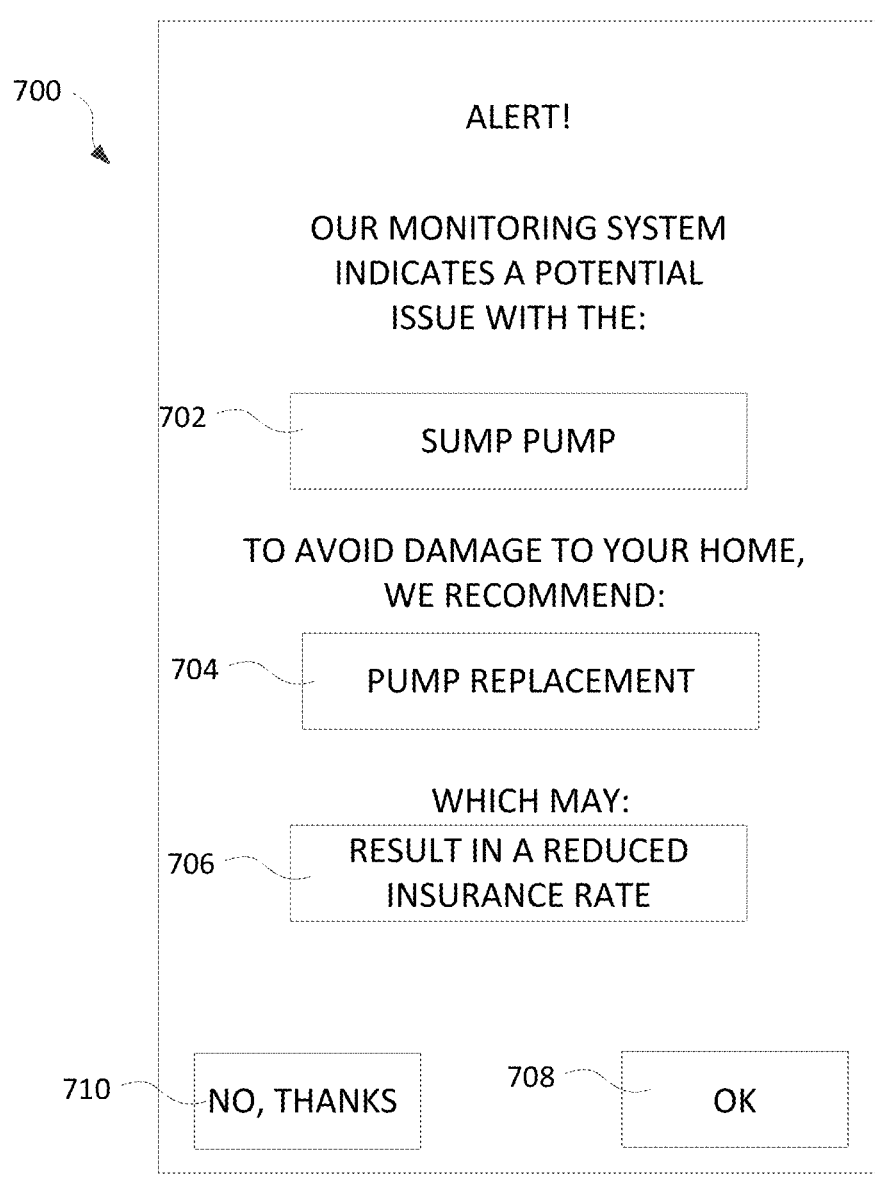
FIG. 7 is an example user interface providing an alert to a user including a proposed modification and incentive according to one or more aspects described herein.

FIG. 7 illustrates one example user interface providing an alert according to one or more aspects described herein. The user interface 700 may be presented to a user via a computing device, such as computing devices 314a-314e in FIG. 3. In the example shown, the interface 700 includes field 702 indicating the home device from which the data was received. In the example shown, the sump pump was the home device from which data was received. The data received was indicative of an issue (e.g., power consumption was outside the predetermined threshold). Accordingly, the alert was generated.

Interface 700 further includes field 704 in which one or more proposed modifications may be provided to the user. In the example shown, the suggested modification is replacement of the sump pump. Field 706 provides one or more incentives to the user to implement the recommended modifications. For instance, a reduced insurance rate is offered to the user if the suggested modifications are implemented.

The user may select "OK" option 708 to accept or acknowledge the alert. In some examples, selection of "OK" option may prompt the user with additional user interfaces to facilitate implementing the recommended modifications, receiving the offered incentive, etc.

Alternatively, the user may select "No, Thanks" option 710 to clear the alert and take no further action at that particular time. In some arrangements, the incentive offered may be available to the user for a predetermined amount of time (e.g., one week, one month, etc.).

Provided below are various example arrangements of the home device sensing systems described herein and one or more implementations of such systems. The arrangements described below are merely some examples of systems and implementations, and nothing in the examples should be construed as limiting the invention to only those examples. Rather, various other systems and implementations may be used without departing from the invention.

In one example, data received from one or more sensors associated with a primary sump pump and a backup or secondary sump pumps (e.g., sensors indicating power consumption) may indicate that the secondary sump pump is running while the primary sump pump is not running and one or more moisture sensors may indicate that there is little or no moisture (e.g., within the predetermined acceptable threshold for moisture). Although this data may be analyzed or interpreted independently (e.g., data from each signal may be considered independently of data from the other sensors), in some examples, the data may be aggregated to provide more accurate root cause analysis. For instance, in the above example, this data, when considered together, may indicate a problem with the primary sump pump (which should be running before the secondary sump pump would run). An alert may be generated for the user associated with the sump pump that may identify the potential issue (e.g., potential failure of primary sump pump), identify a modification (e.g., service the pump and/or replace pump), and/or may offer an incentive to implement a modification (e.g., your deductible may be reduced by replacing the primary sump pump because the risk of flood damage may be reduced). Accordingly, the home device sensing system may act as an early warning system for users to identify issues with one or more home devices before the potential issue leads to damage to the home.

In another example, data received from one or more sensors associated with a primary sump pump may indicate that the sump pump has been running for an extended period of time (for example, over an hour). This data may be compared with historical data to determine that the primary sump pump typically runs for thirty (30) seconds every fifteen (15) minutes. Accordingly, the current run time may be identified as outside a predetermined threshold range of the historical data. Additionally, data may be received (from the one or more sensors or from additional sensors) indicating that a secondary sump pump is not running, the moisture levels are within an acceptable range, and weather data indicates that no heavy rain is occurring at the location of the home device. Accordingly, an alert may be generated indicating that there may be a problem with the primary sump pump that is causing it to run continuously. The alert may be transmitted to the user associated with the sump pump and/or to the insurance agent.

In yet another example, a sensor may be used to detect a heat transfer coefficient across a hot water heater. This sensor may transmit data indicative of corrosion within the hot water heater. Accordingly, when the heat transfer coefficient is determined to be outside of a predetermined threshold, an alert may be generated and transmitted indicating a risk of failure of the hot water heater before the failure occurs. The alert may also recommend replacement of the hot water heater prior to failure and any subsequent damage.

Various other sensing arrangements of one or more appliances, systems, etc. may be used without departing from the invention.

The systems, apparatuses, methods and computer-readable media discussed above may provide a more robust analysis of data received from one or more sensors, which may then provide more accurate indications of problems, issues, failures, etc. As discussed above, sensor data received from one or more systems may be aggregated with publicly available information, such as weather data, to provide more accurate indications of the cause of an issue or failure. For instance, as discussed above, the received sensor data may be aggregated with, for example, weather data, to understand additional factors associated with the home, locality, etc. in order to determine whether an actual issue exists or whether there is a failure of a sensor or inaccurate reading. In some arrangements, data received from sensors may be aggregated with those of other users to understand whether an issue is particular to a home or is a more widespread issue (e.g., failure of a primary sump pump leading to secondary pump running or neighborhood has increased indication of sump pumps running with may indicate a larger issue).

The systems, apparatuses, computer-readable media and methods described above may further provide for increased accuracy in identifying risk associated with a home, neighborhood, locality, etc. Accordingly, one or more insurance rates, premiums, and the like, may be adjusted based on this more accurate risk.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A system, comprising: a home device;
   a sensing device in communication with the home device and integrated into the home device, the sensing device being configured to monitor operation of the home device;
   a processing unit comprising a processor; and
   a memory unit communicatively coupled to the processing unit and storing computer-executable instructions, which when executed by the processing unit, cause the system to:
   receive, via a wireless transmission, data from the sensing device;
   process, in real-time, the received data to determine characteristic data of the home device in communication with the sensing device;
   compare the determined characteristic data to characteristic data for devices within a predefined distance of the home device to determine whether the characteristic data is within a predetermined threshold for a locality;
   responsive to determining that the characteristic data is within the predetermined threshold for the locality, identify a first insurance incentive to provide to a user based on the characteristic data being within the predetermined threshold;
   responsive to determining that the characteristic data is outside of the predetermined threshold for the locality:
   identify a proposed modification to the home device;
   identify a second insurance incentive different from the first insurance incentive, to implement the identified proposed modification to the home device;
   generate a user interface including an alert comprising the proposed modification and the second insurance incentive; and
   transmit, to a user computing device, the generated user interface.

2. The system of claim 1, wherein the home device is a sump pump.

3. The system of claim 1, wherein the received data from the sensing device includes a plurality of signals received from a plurality of devices in communication with the home device.

4. The system of claim 3, wherein each device of the plurality of devices is configured to sense a different characteristic of the home device.

5. The system of claim 1, further including instructions that, when executed, cause the system to:
   responsive to determining that the characteristic data is within the predetermined threshold for the locality, store the characteristic data for future use, wherein the future use of the stored characteristic data includes comparing the characteristic data to characteristic data determined at a second time and, based on the comparison, providing a third insurance incentive to the user to make an alternate modification to the home device.

6. The system of claim 1, wherein the alert further includes identification of the home device.

7. The system of claim 1, wherein the predefined distance includes a predefined radius.

8. A system, comprising:
   a first sensing device configured to sense a first characteristic of a first home device;
   a second sensing device configured to sense a second characteristic of the first home device, the second characteristic being different from the first characteristic;
   at least one computing device in communication with the first sensing device and the second sensing device and configured to receive data from the first sensing device and the second sensing device, the at least one computing device including:
   a processing unit comprising a processor; and
   a memory unit communicatively coupled to the processor and storing computer-executable instructions, which when executed by the processing unit, cause the system to:
   receive, from the first sensing device and the second sensing device and via a wireless transmission, data transmitted by the first sensing device and the second sensing device;
   process the received data to determine first characteristic data from the first sensing device and second characteristic data from the second sensing device;
   compare the first characteristic data and second characteristic data to historical data of other devices to determine whether at least one of the first characteristic data and the second characteristic data is outside of a threshold range of the historical data; and responsive to determining, based on the comparison, that the at least one of the first characteristic data and the second characteristic data is outside of a threshold range of the historical data:
  identify a modification for the first home device to reduce risk of failure of the first home device;
  identify a first insurance incentive to transmit to a first user to implement the identified modification;
  generate a user interface including an alert comprising the modification and the first insurance incentive;
  transmit, to a computing device of the first user, the generated user interface; and
responsive to determining, based on the comparison, that the at least one of the first characteristic data and the second characteristic data is within the threshold range of the historical data, identifying a second insurance incentive, different from the first insurance incentive, to provide to the first user and transmitting the second insurance incentive to the computing device of the first user.

9. The system of claim 8, wherein the first sensing device is integrated into the first home device.

10. The system of claim 8, wherein the first characteristic is power consumption and the second characteristic is water level.

11. The system of claim 8, further including a second home device having a least a third sensor configured to sense a third characteristic, the second home device being a backup of the first home device and the at least one computing device being in communication with the second home device.

12. The system of claim 11, wherein the third characteristic is power consumption and wherein third characteristic data is received from the third sensor and the second insurance incentive is a reduced premium, and the modification is replacement of the first home device.

13. The system of claim 8, wherein the first home device is associated with the first user and wherein the memory unit further includes instructions, that when executed by the processing unit, cause the system to:
  compare the first characteristic data and second characteristic data with data received from a second home device of at least a second user different from the first user, the second home device being in communication with the at least one computing device.

14. The system of claim 13, wherein the second home device of the at least a second user is within a predefined distance of the first home device of the first user.

15. The system of claim 14, further including instructions, that when executed by the processing unit, cause the system to:
  determine an insurance rate for the first user and the second user based on the comparison.

16. A method, comprising:
receiving, by a computing device, via a wireless transmission and from a sensing device in communication with a home device, characteristic data of the home device;
comparing, by the computing device, the received characteristic data to characteristic data for devices within a predefined distance of the home device to determine, in real-time and by the computing device, whether the characteristic data is within a predetermined threshold for a locality;
if it is determined that the characteristic data is within the predetermined threshold for the locality, identifying a first insurance incentive to provide to a user associated with the home device; and
if it is determined that the characteristic data is outside of the predetermined threshold for the locality:
  identifying, by the computing device a proposed modification to the home device to reduce risk of failure of the home device;
  identifying a second insurance incentive, different from the first insurance incentive to implement the proposed modification to the home device;
  generating a user interface including an alert comprising the proposed modification and the second insurance incentive; and
  transmitting the user interface to a computing device of a user.

17. The method of claim 16, wherein the home device is a sump pump.

18. The method of claim 16, further including storing the characteristic data for future use if it is determined that the characteristic data is within the predetermined threshold for the locality.

19. The method of claim 18, wherein the future use of the stored characteristic data includes comparing the characteristic data to characteristic data determined at a second time and, based on the comparison, providing a third insurance incentive to the user to make an alternate modification to the home device.

20. The method of claim 16, wherein the alert further includes identification of the home device.

* * * * *